United States Patent [19]

Bedford

[11] 4,366,737

[45] Jan. 4, 1983

[54] CUTTING HEAD FOR FILTER ASSEMBLER

[75] Inventor: Michael J. Bedford, High Wycombe, England

[73] Assignee: Molins Limited, England

[21] Appl. No.: 201,614

[22] Filed: Oct. 28, 1980

[30] Foreign Application Priority Data

Oct. 31, 1979 [GB] United Kingdom ................. 7937713
Mar. 13, 1980 [GB] United Kingdom ................. 8008637

[51] Int. Cl.[3] ............................................ B23D 25/02

[52] U.S. Cl. ........................................ 83/341; 83/346; 83/348; 83/542; 83/677

[58] Field of Search ................. 83/341, 348, 347, 346, 83/663, 665, 674, 677, 698, 699, 542

[56] References Cited

U.S. PATENT DOCUMENTS

| | | | |
|---|---|---|---|
| 461,600 | 10/1891 | West | 83/348 |
| 1,006,783 | 10/1911 | Paquin | 83/341 X |
| 2,341,503 | 2/1944 | Bombard | 83/346 X |
| 2,682,306 | 6/1954 | Schriber | 83/346 |
| 2,829,691 | 4/1958 | Jarvis | 83/341 |
| 3,174,372 | 3/1965 | Huck | 83/341 X |
| 3,257,885 | 6/1966 | Hornung | 83/348 X |
| 3,340,757 | 9/1967 | Rudszinat | 83/674 X |
| 4,083,279 | 4/1978 | Wester et al. | 83/348 X |
| 4,240,313 | 12/1980 | Gillespie | 83/346 X |

*Primary Examiner*—James M. Meister
*Attorney, Agent, or Firm*—Antonelli, Terry & Wands

[57] ABSTRACT

A cutting head for a filter attachment machine comprises a carrier drum carrying at circumferentially spaced positions a number of knife bodies each of which is clamped onto the drum by retaining devices engaging the ends of the knife body, and including an interposed layer of rubber or other resilient material lying at least in the region below the middle of the knife body, each knife body, its retaining devices and its rubber layer being so arranged that when the knife body is secured in position by the retaining devices, it is flexed slightly so that its cutting edge is slightly convex.

3 Claims, 4 Drawing Figures

CUTTING HEAD FOR FILTER ASSEMBLER

This invention is concerned with a cutting head for a filter assembler, which is a machine for making filter cigarettes by joining filter portions to tobacco rods by means of uniting bands. These bands are cut from a web which is often of cork-like appearance and is for that reason usually referred to as "cork".

A common form of cutting head comprises a drum carrying a number of circumferentially spaced knives which cooperate with anvil inserts in a drum carrying the cork web, each cut being achieved by a pinching action. In one common cutting head, each individual knife is pivotally mounted on its carrier drum and is radilly adjustable with respect to the axis of the drum. This allows the cutting edge of each knife to be set at a desired distance from the axis of the drum, while the freedom of pivotal motion accomodates any lack of parallelism between the axis of the cutting head drum and that of the drum carrying the cork web.

There are normally fewer knives on the cutting drum than anvils on the cork drum. Accordingly, it is not possible to set each knife so as to take account of any slight variation in regard to the distance of each anvil surface from the axis of the cork drum. Therefore the load of the knives on the anvils can vary, especially if the cork drum is heated.

The same problem arises in connection with the cutting drum described in Molins Limited British Pat. No. 1,469,684, in which each knife is secured to the cutting drum, which is itself universally pivoted on its drive shaft.

According to one aspect of the present invention, a cutting head for a filter attachment machine comprises a carrier drum carrying at circumferentially spaced positions a number of knife bodies each of which is clamped onto the drum by retaining devices engaging the ends of the knife body, and including an interposed layer of rubber or other resilient material lying at least in the region below the middle of the knife body, each knife body, its retaining devices and its rubber layer being so arranged that when the knife body is secured in position by the retaining devices, it is flexed slightly so that its cutting edge is slightly convex.

We have found that a slightly convex knife edge is desirable, especially if the knife is resilient and is resiliently backed, since each cutting operation then begins at the center of the knife edge and progresses outwards towards the ends of the knife. In principle, in place of the preferred arrangement described above, it is possible to machine the knife body with a slightly convex cutting edge (instead of with a straight edge) and to support the body at its ends, allowing it to flex inwards during cutting owing to its own resilience, with or without a rubber or spring backing.

An example of a cutting head according to this invention is shown in the accompanying drawings. In these drawings.

Figure 1:
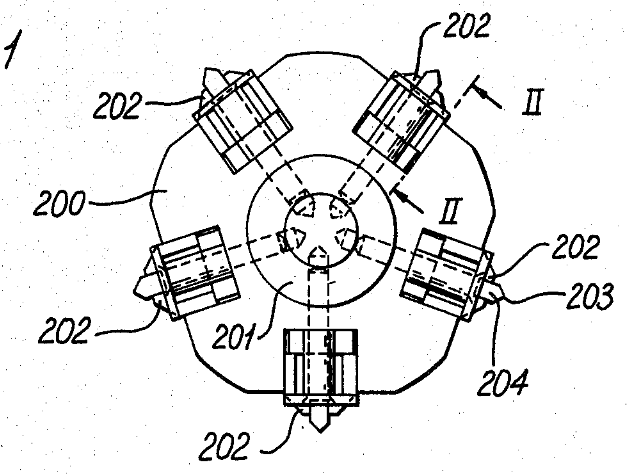
FIG. 1 is an end view of the cutting head.
Figure 2:
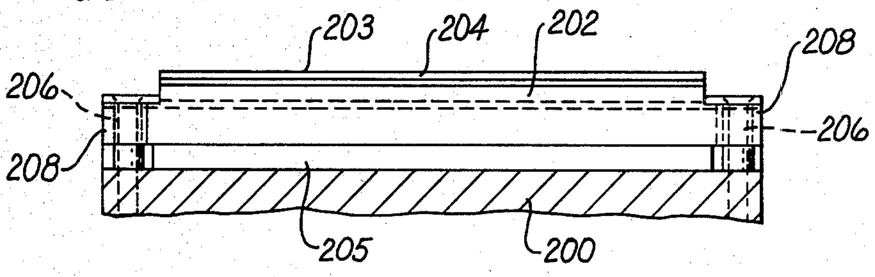
FIG. 2 is a fragmentary section on the line II—II in FIG. 1.

The cutting head shown in the drawings comprises a carrier drum 200 formed at each end with a shaft 201 by which the head is mounted and driven. A number of longitudinal grooves are machined in the surface of the drum, and each contains a knife body 202 having a cutting edge 203 formed on a hardened insert 204 brazed or bonded to the main part of the knife body.

Below the knife body there is a strip of rubber or similar elastomeric material 205 against which the knife body is clamped by retaining devices in the form of screws 206 passing through slots 207 in flanges 208 at the ends of the knife body. Around each screw 206 there is a collar 209. When the screws are tightened, a head 210 on each screw engages a washer 211 which in turn engages one end of the collar, the other end of which engages the bottom of the groove in the drum 200. Thus the length of the collars determines the amount by which the rubber is compressed. However, the knife body is preferably sufficiently flexible along its length so as to bend slightly under the action of the screws and the resistance of the rubber, so that the cutting edge 203 becomes slightly convex. Such convexity can hardly be detected by the naked eye and is not shown in the drawings. For example, as an idea of scale, the thickness of the rubber strip may be 4 mm; and the difference between the length of the collar 209 and the combined thickness of the flange 208 and rubber strip 205 may be of the order of 0.076 mm. Naturally, the middle region of the rubber strip is also compressed (though less than the ends), so that the difference in "height" between the middle of the cutting edge and ends is considerably less than 0.076 mm; it may, for example, be of the order of 0.0127 mm.

Collars of slightly different lengths may be provided to allow in effect for adjustment of the heights of the ends of the cutting edge.

Figure 3:
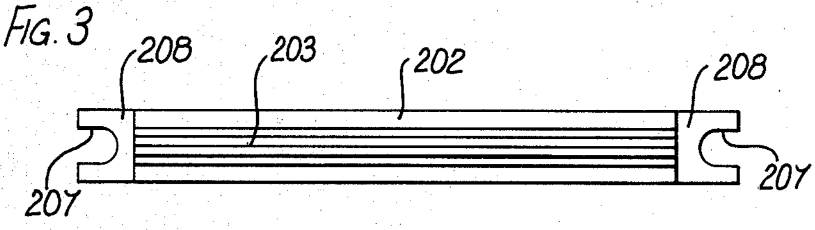
FIG. 3 is a plan view of one of the knife body.
Figure 4:
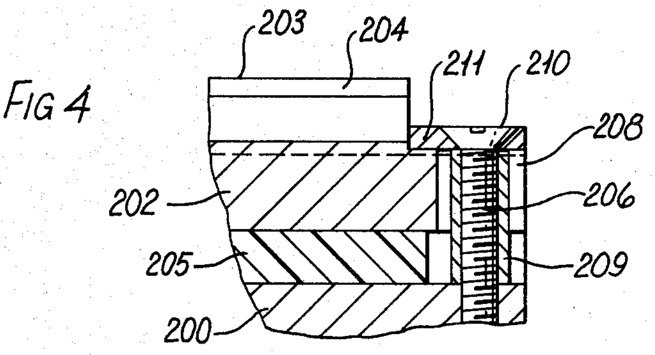
FIG. 4 is an enlargement of one end of FIG. 2.

When viewed from above (i.e. looking directly past the knife edge towards the axis of the drum as in FIG. 3) each knife may be slightly inclined to the drum axis so to provide a progressive cutting action as described above. For this purpose, the knife body may be made more rigid so as to avoid any significant curving of the cutting edge.

The angle of inclination may, for example, be such that, for a knife edge of 90 mm length, the offset of one end with respect to the other is approximately 1 mm.

Other means for securing a slightly inclined knife to the carrier drum may be employed, preferably with some form of resilient backing, e.g. a rubber strip.

I claim:

1. A cutting head for a filter attachment machine, comprising a carrier drum carrying at circumferentially spaced positions a number of knife bodies each of which is clamped onto the drum by retaining devices engaging the ends of the knife body and adapted to urge the said ends substantially radially inwardly with respect to the drum, and including an interposed layer of elastomeric material lying between the drum and the knife body along substantially the entire length of the knife body, each knife body, its retaining devices and its elastomeric layer being so arranged and dimensioned that with the knife body secured in position by the retaining devices, it is flexed by said elastomeric layer so that its cutting edge is slightly convex.

2. A cutting head for a filter attachment machine, comprising a carrier drum carrying at circumferentially spaced positions a number of knife bodies each of which is clamped onto the drum by retaining devices engaging the ends of the knife body, and including an interposed layer of elastomeric material lying at least in the region below the middle of the knife body, each knife body, its retaining devices and its elastomeric layer being so arranged that when the knife body is secured in position by the retaining devices, it is flexed slightly so that its cutting edge is slightly convex, said retaining devices comprising screws, each screw being associated with a spacer member limiting the movement of the corresponding end of the knife body towards the drum when the screw is tightened.

3. A cutting head according to claim 2 in which each spacer member comprises a collar which surrounds the screw and passes through an aperture or slot in the knife body.

* * * * *